United States Patent [19]

West

[11] Patent Number: 4,491,838
[45] Date of Patent: Jan. 1, 1985

[54] STARLOOP COMMUNICATION NETWORK AND CONTROL SYSTEM THEREFOR

[75] Inventor: Lynn P. West, Austin, Tex.

[73] Assignee: International Business Machines Corporation, Armonk, N.Y.

[21] Appl. No.: 402,654

[22] Filed: Jul. 28, 1982

[51] Int. Cl.³ .......... H04B 3/46; H04J 3/14; H04L 11/20; H04Q 3/54
[52] U.S. Cl. .......... 340/825.05; 340/825.16; 370/14; 370/58; 370/86
[58] Field of Search .......... 340/825.5, 825.05, 825.8, 340/825.16, 825.79, 825.83; 371/11; 370/13, 14, 16, 42, 54, 58, 62, 79, 86, 88; 179/2 R, 2 DP, 22

[56] References Cited

U.S. PATENT DOCUMENTS

| 3,639,904 | 2/1972 | Arulpragasam | 370/86 |
|---|---|---|---|
| 3,905,023 | 9/1975 | Perpiglia | 371/11 X |
| 3,979,723 | 9/1976 | Hughes et al. | 370/31 |
| 4,035,770 | 7/1977 | Sarle | 371/11 |
| 4,195,351 | 3/1980 | Barner et al. | 364/900 |
| 4,201,890 | 5/1980 | Lawrence et al. | 370/68 |
| 4,251,880 | 2/1981 | Baugh et al. | 370/80 |
| 4,352,180 | 9/1982 | Schulze | 370/58 |
| 4,393,381 | 7/1983 | Seiden | 340/825.83 |
| 4,417,245 | 11/1983 | Melas et al. | 340/825.8 |

OTHER PUBLICATIONS

"A Comparison of Architectural Alternatives for Local Voice/Data Communications", Baxter and Baugh, *IEEE Communications Magazine*, Jan. 1982, pp. 44-51.
"Remote Automatic Duplexed Switching," R. O. Skatrud, *IBM Technical Disclosure Bulletin*, vol. 21, No. 8, Jan. 1979, pp. 3304-3305.
"Automatic Loop Reconfigurator," G. J. Laurer & R. O. Skatrud, *IBM Technical Disclosure Bulletin*, vol. 19, No. 10, Mar. 1977, pp. 3824-3828.

*Primary Examiner*—Thomas W. Brown
*Attorney, Agent, or Firm*—John W. Henderson, Jr.; Douglas H. Lefeve

[57] ABSTRACT

A starloop communication network for intraestablishment communication in a multiterminal processing system includes a digital switch as its central terminal. In the basic mode, the switch is configured so that the input from each terminal is switched back to the next terminal forming a loop network. A central processor in the network need only service the output of the first terminal on the loop and the input from the last terminal. The digital switch includes a port connected to monitor activity on the loop. In the event of a failure, the monitor can determine the failing terminal in the loop by use of a binary search around the loop. The failing terminal will be detected by the monitor and automatically isolated from the loop by the digital switch. The communication network may also be configured to include a plurality of terminal devices of equal performance and intelligence, i.e. a plurality of central processors.

6 Claims, 9 Drawing Figures

STARLOOP COMMUNICATION NETWORK AND CONTROL SYSTEM THEREFOR

TECHNICAL FIELD

This invention relates to data communications in general and more particularly to data communications networks and controls therefor.

BACKGROUND ART

Networks for the communication of data between a central facility and a plurality of remote terminal devices are well known and may take many forms. A common form of the communication network is the loop configuration. In a loop communications configuration the stations in the loop are connected serially such that messages from the central facility pass serially through each station. The messages are coded so that the station to which the message is directed will be able to recognize the message as belonging to it. Likewise only one message at a time arrives at the central processor so that CPU overruns are unlikely even at a high throughput level. Loops do however manifest certain technical drawbacks. One of the more notable of these is that of the portable terminal. Whenever a terminal is unplugged from the loop to be moved, an unsophisticated loop system simply stops working because the series connection of the loop elements is broken. Further, power supply failure at a terminal can cause the repeating function at that terminal to fail and can also bring down the entire network. A third problem is that inadvertent or deliberate damage to any link can disrupt the operation of the entire loop.

A second type of communication network is the star configuration. In a star configuration each of the remote terminals is connected directly to the central processor for input and output. The most significant difficulty with a star configuration is that if it is operated in an asynchronous response mode the short term burst traffic at the central processor can easily exceed ten times the mean traffic rate so that the central processor must be overdesigned. Conversely, if the star configuration is operated by polling, the performance drops dramatically. The central processor can spend many more cycles servicing polls than messages, so it must still be overdesigned. A multidrop arrangement is confronted with traffic management difficulties similar to those of a star.

DISCLOSURE OF THE INVENTION

The present invention provides a starloop network configuration for intra-establishment communication in a multi-terminal processing system. The network is wired as a star, but with the central termination to a digital switch rather than the central processing unit. In the basic mode, the digital switch is configured so that the input from each terminal is switched back to the next terminal, forming a loop network. The central processor need only service the output to the first terminal on the loop and the input from the last terminal. A second port on the central processor is connected to monitor the loop. In the event of a failure, the loop monitor can determine whether the failing link is in the first or last half of the loop. By use of a binary search using the monitor switch to port and a loop entry point switched port, a failure in the loop can be automatically isolated and bypassed.

An additional significant feature of the invention is that if a collection (two or more) of terminals are present within the establishment which operate in point-to-point, star, or multipoint modes, the starloop switch can easily configure subsections of the network into these logical connections.

A third feature of the invention is that the starloop switch can configure multiplicities of loops, rings, multipoints or stars to meet load balancing needs or other establishment requirements. The protocols and rates in use on any one subnetwork can be independent of the others. The starloop switch can dynamically alter these configurations to serve advanced terminals which manifest time-varying connectivity and/or bandwidth requirements.

BEST MODE FOR CARRYING OUT THE INVENTION

Figure 1:
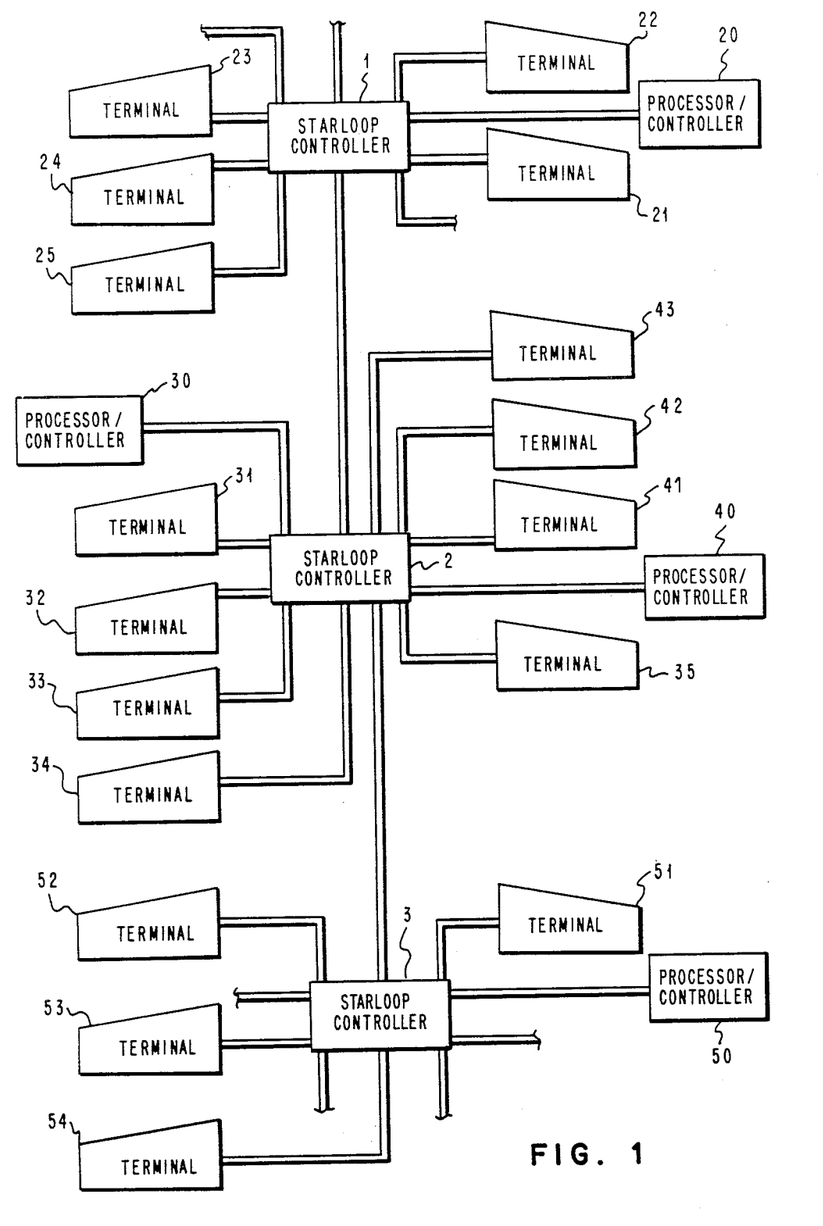
FIG. 1 is a block diagram of a communication network constructed according to the invention.

The network shown in FIG. 1 is suitable as a data communication network for many applications. For example, it could be used as an intra-establishment network to connect a plurality of terminals located throughout a building with one or a plurality of central processors. The starloop controllers 1, 2 and 3 may be located on different floors of a multistory building. The central processor 20 may be an IBM System 370 computer with terminals 21, 22, 23, 24 and 25 being members of the IBM 3270 family of terminals. The remaining processors/controllers 30, 40 and 50 similarly may be large processors or smaller computers such as the IBM System 34 or IBM 5520 Administrative System with the remaining terminals 31-35, 41-43 and 51-54 being display work stations associated with any of the processors.

Figure 2:
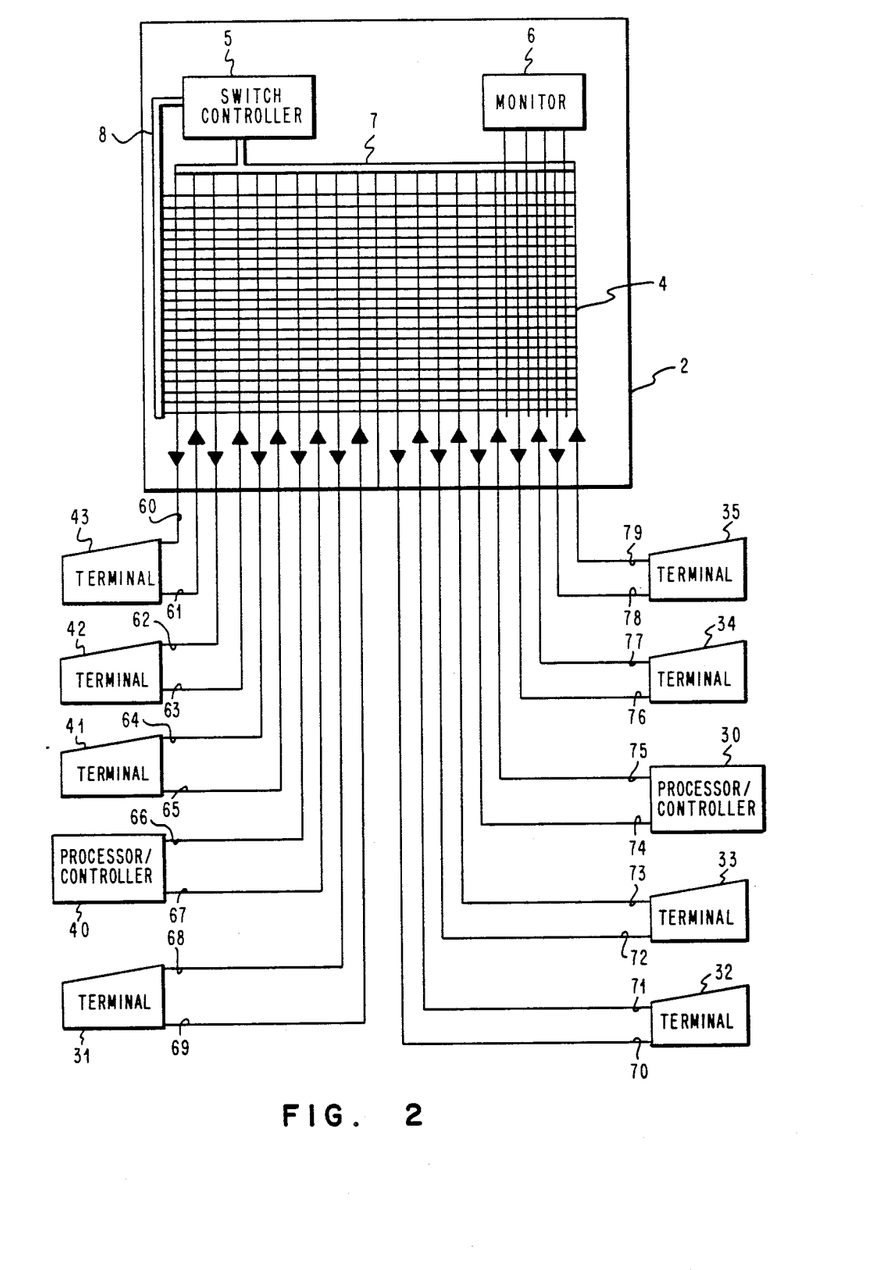
FIG. 2 is a block diagram of a single starloop controller and associated terminals shown in FIG. 1.

As shown in FIG. 2 each starloop controller 2 contains a matrix 4 of horizontal conductive elements 8 and vertical conductive elements 7 with each set of conductive elements have one connection to each terminal and processor. The conductive matrix 4 is a solid state unit of the type generally known as a crosspoint switch which is controllable by programmable switch controller 5 to make the proper conductive connections between the horizontal and vertical conductive elements. Any suitable high speed crosspoint switch may be used as the conductive matrix 4. Such a switch is disclosed in FIGS. 2-4 and the descriptive text associated therewith in copending U.S. application Ser. No. 298,705, now U.S. Pat. No. 4,417,245, filed Sept. 2, 1981, by C. M. Melas, et al, entitled "Digital Space Division Exchange" and assigned to the present assignee. For purposes of a complete description of the design of the crosspoint switch, the said copending Melas, et al application is expressly incorporated herein by reference. The monitor 6 operates under control of the switch controller 5 to monitor any of the connections between the conductive elements 7 and 8 as determined by the switch controller 5.

Figure 3:
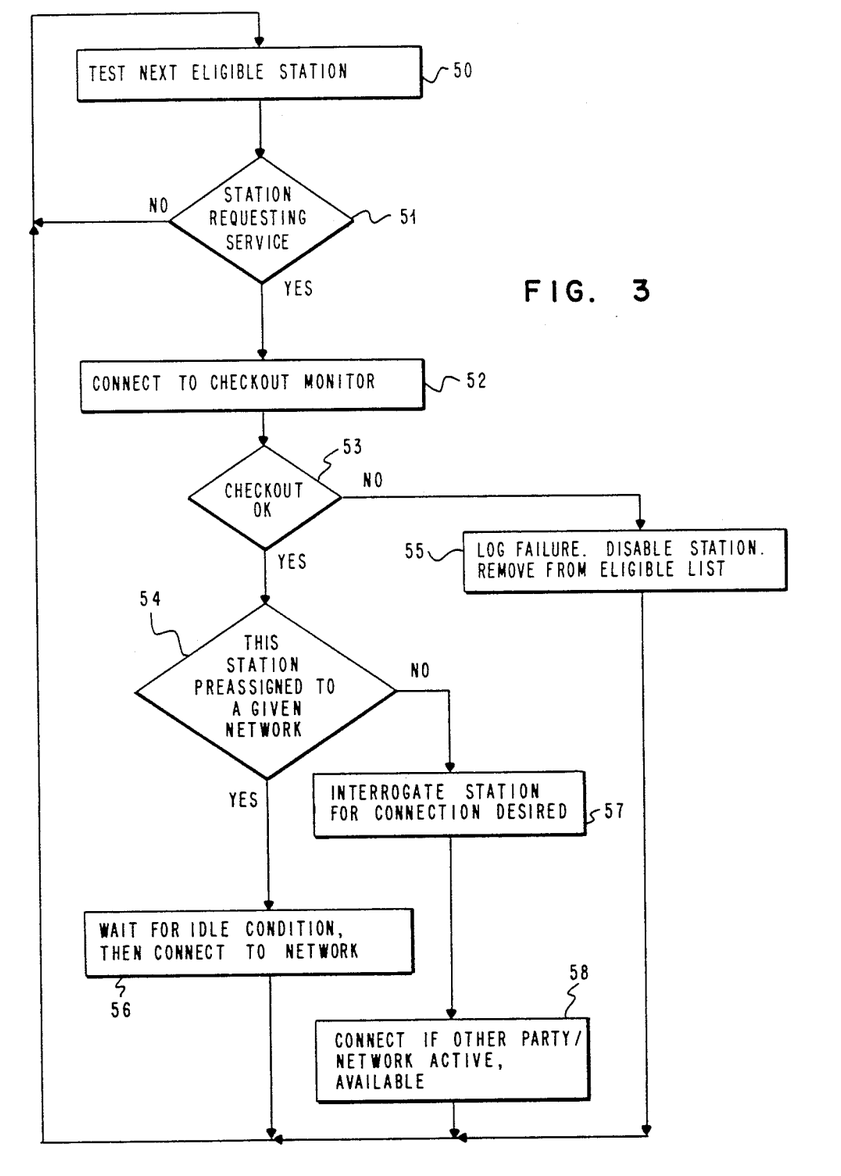
FIG. 3 is a flow diagram of the controller operation for connecting a new station on the loop.

Referring now to FIG. 3, the system continuously operates in a mode where the controller 5 checks each station to determine if the terminal is requesting connection to the system. In block 50 each station which is eligible to be connected to the system is tested in turn. If the terminal station is not requesting service, then in block 51 the controller 5 returns to block 50 and proceeds to test the next eligible terminal station. If a tested station is requesting connection to the network, then in block 54 the terminal station is connected to the monitor 6 for checkout. During checkout, a message will be sent from the monitor 6 to the terminal station and received back. In block 53 the monitor 6 examines the message received to determine if the tested terminal station is operating properly. If not, then in block 55 an error is recorded by the monitor 6 for the station and the station is removed from further checking by the controller 5. If the terminal does checkout properly, then in block 54 the terminal station code is examined by the controller 5 to determine if the terminal is preassigned to an existing network. If so, then in block 56 the terminal is connected to the preassigned network and the controller 5 returns to block 50 to test the next eligible terminal. However, if the terminal is not preassigned to an existing network, then in block 57 the controller 5 interrogates the terminal to determine its desired connection. This interrogation goes out in the form of a request to the operator of the terminal to enter a desired network identification code or to an automatic function within the terminal which is preprogrammed to output a network identification code for the terminal. In block 58 when the desired connection data is returned to the controller 5, the controller 5 connects the terminal to the requested network if the network is active. The controller 5 then proceeds to step 50 to test the next eligible terminal station.

Figure 4:
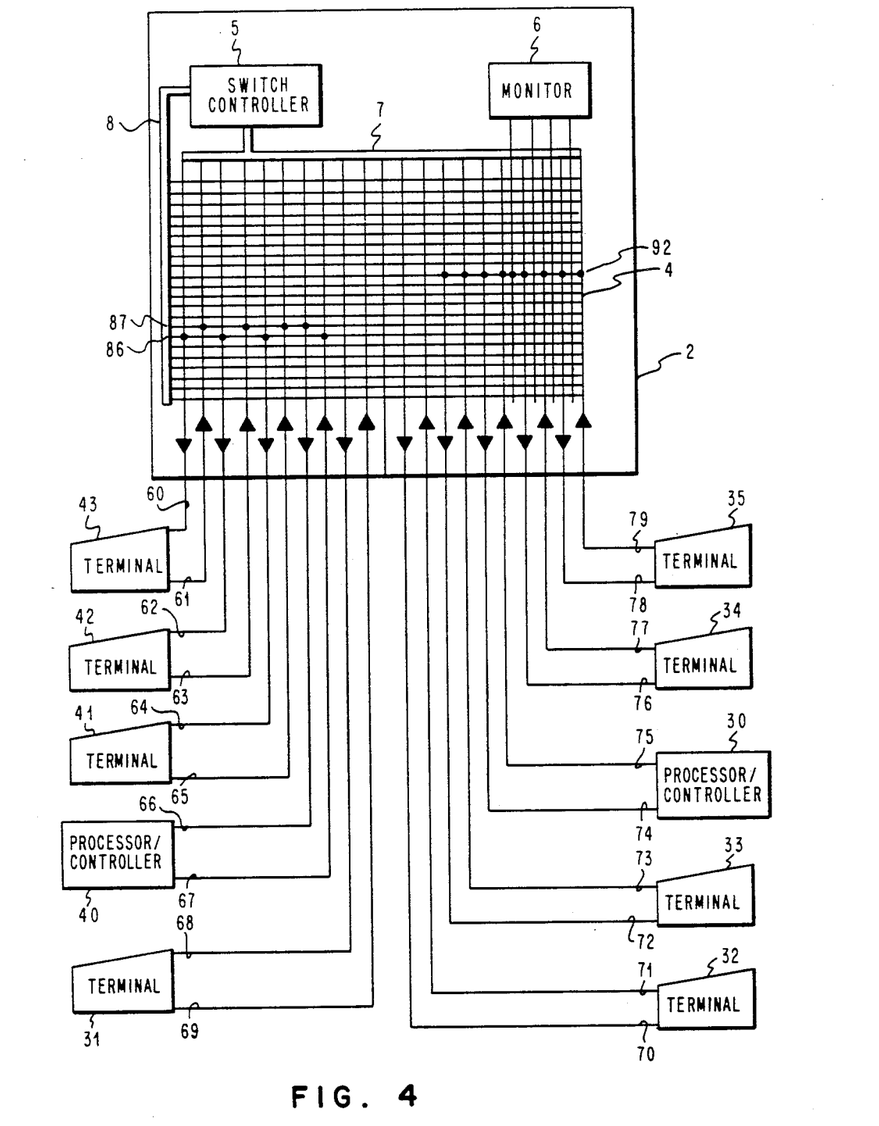
FIGS. 4-8 show a plurality of different loop configurations under the control of the controller.
Figure 5:
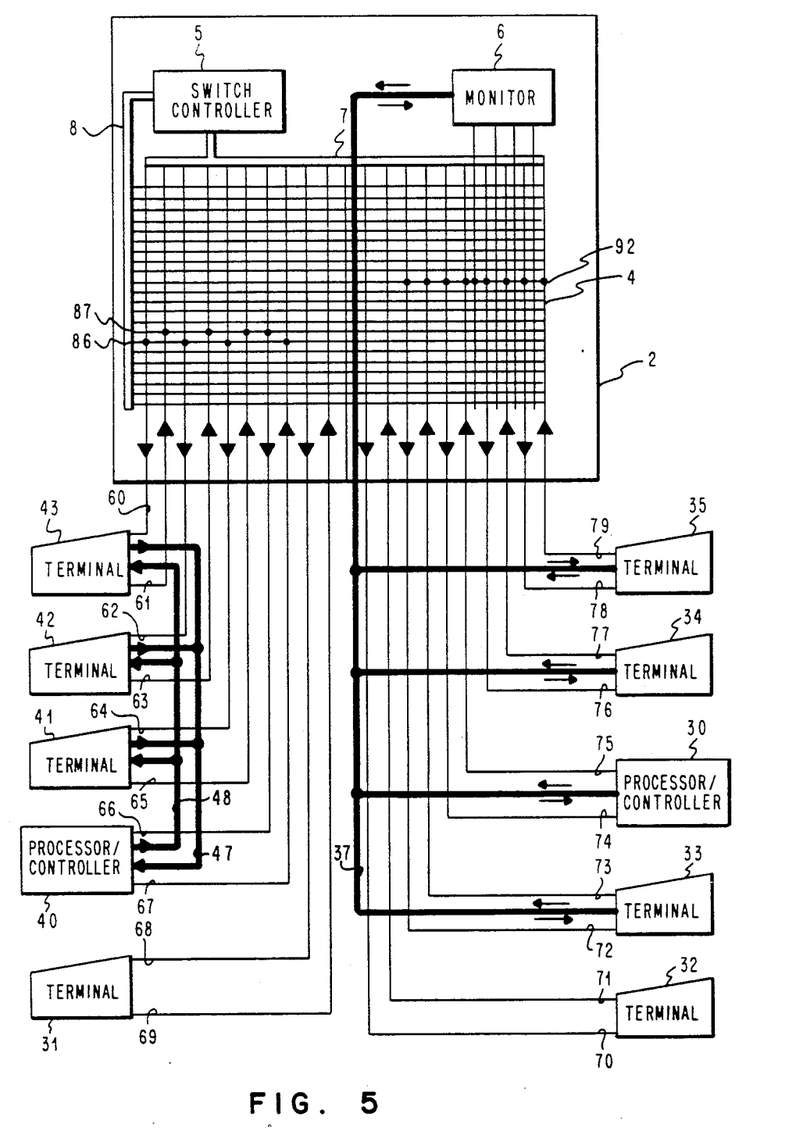

Referring now to FIG. 4, an example of two network connections is shown. The terminals 41, 42 and 43 are connected in a parallel multi-drop session to the processor 40. The output bus 67 of the processor 40 is connected to the input bus 64 of terminal 41, the input bus 62 of terminal 42, and the input bus 60 of terminal 43 along grid line 86. The output bus 61 of terminal 43, the output bus 63 of terminal 42, and the output bus 65 of terminal 41 are each connected to the input bus 66 of processor 40 through grid line 87. These connections are shown as heavy bus lines 47 and 48 in FIG. 5 for ease of explanation and understanding.

Still referring to FIG. 4, the connections along grid line 92 connect the input and output lines 74 and 75 of processor 30 to the input and output lines 72 and 73 of terminal 33, 76 and 77 of terminal 34, 78 and 79 and terminal 35 and the monitor 6. These connections essentially provide bidirectional communications and are shown as the heavy bus line 37 of FIG. 5. While these example configurations are shown as networks containing one or more central processors and a plurality of terminals, it should be understood that this is exemplary only and that all the system elements in a particular network could be of equal capability and performance, or what is commonly called "peers".

Figure 6:
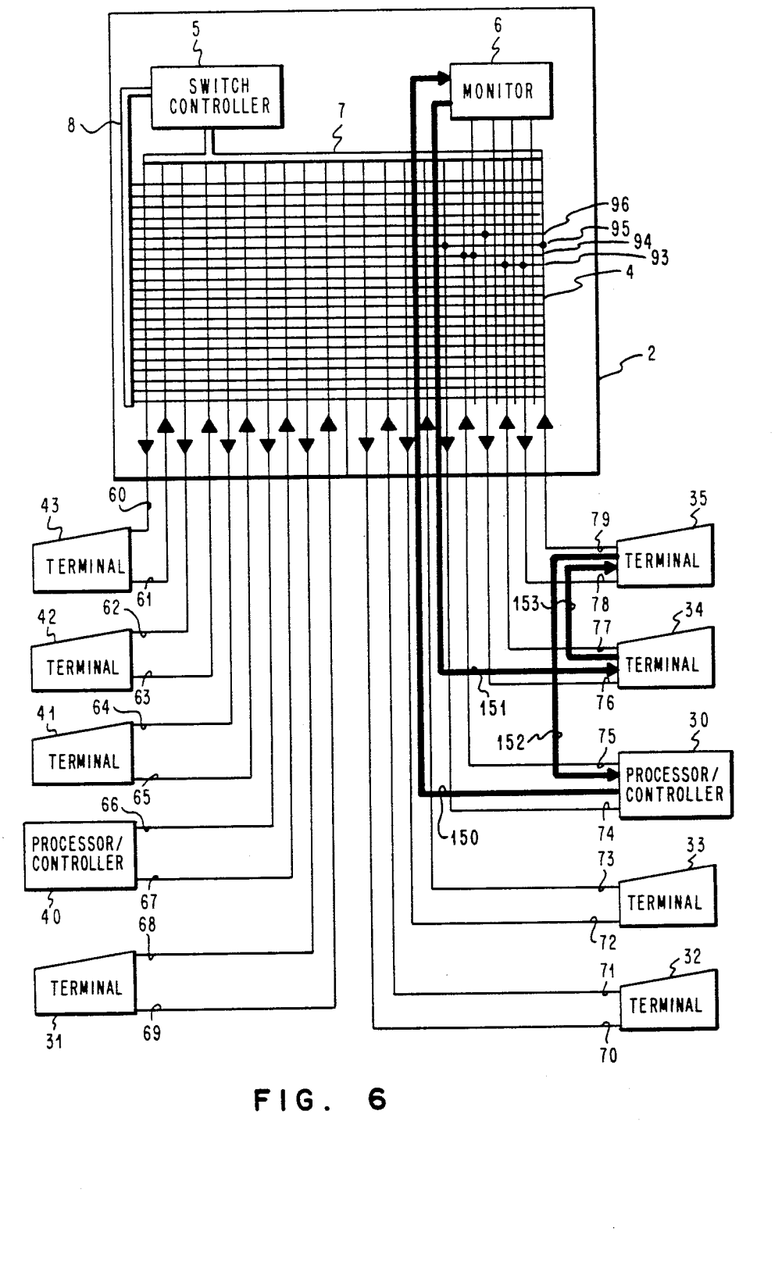

Referring now to FIG. 6, a loop communication system is shown wherein the monitor 6 forms a part of the loop. The output bus 75 of the processor 30 is connected to the monitor 6 on grid line 94. The output of the monitor 6 is connected to the input bus 76 of terminal 34. The output bus 77 of terminal 34 is connected to the input bus 78 of terminal 35 on grid line 93. The output bus 79 of terminal 35 is connected to the input bus 74 of processor 30 along grid line 95 to complete the loop. These connections are shown for clarity as heavy bus lines 150, 151, 152 and 153. The switch controller 5 is capable of connecting the monitor 6 at any point of any configuration to monitor the network for proper operation.

Figure 7:
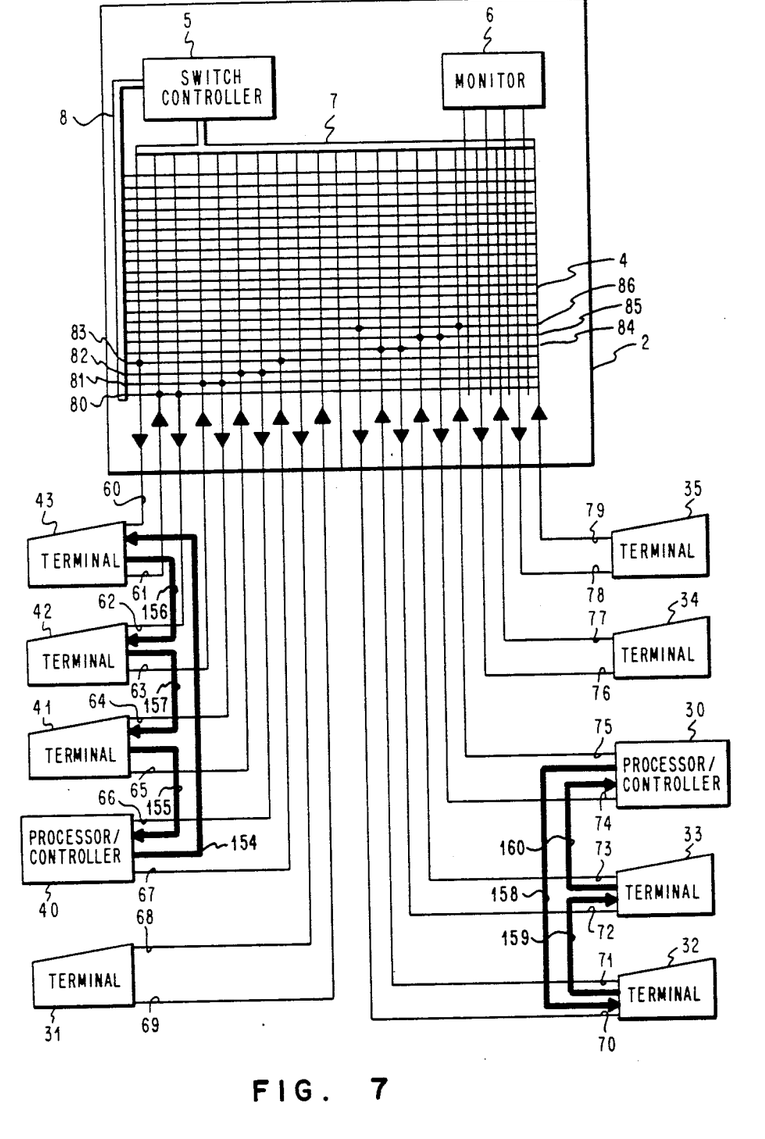

Referring now to FIG. 7, another example of a loop configuration is shown between processor 40, terminal 41, terminal 42 and terminal 43. The output bus 67 of terminal 40 is connected to the input bus 60 of terminal 43 along grid line 83. The output bus 61 of terminal 43 is connected to the input bus 62 of terminal 42 along grid line 80. The output bus 63 of terminal 42 is connected to the input bus 64 of terminal 41 along grid line 81 and the output bus 65 of terminal 41 is connected to the input bus 66 of processor 40 along grid line 82. This loop configuration is illustrated by the heavy bus lines 154, 155, 156 and 157. A second loop configuration is formed by processor 30 and terminals 32 and terminal 33. The output bus 75 of processor 30 is connected to the input bus 70 of terminal 32 along grid line 86. The output bus 71 of terminal 32 if connected to the input bus 72 of terminal 33 along grid line 84. The output bus 73 of terminal 33 is connected to the input bus 74 of processor 30 along grid line 85 to complete the loop. These loop connections are shown as heavy bus lines 158, 159, and 160.

Figure 8:
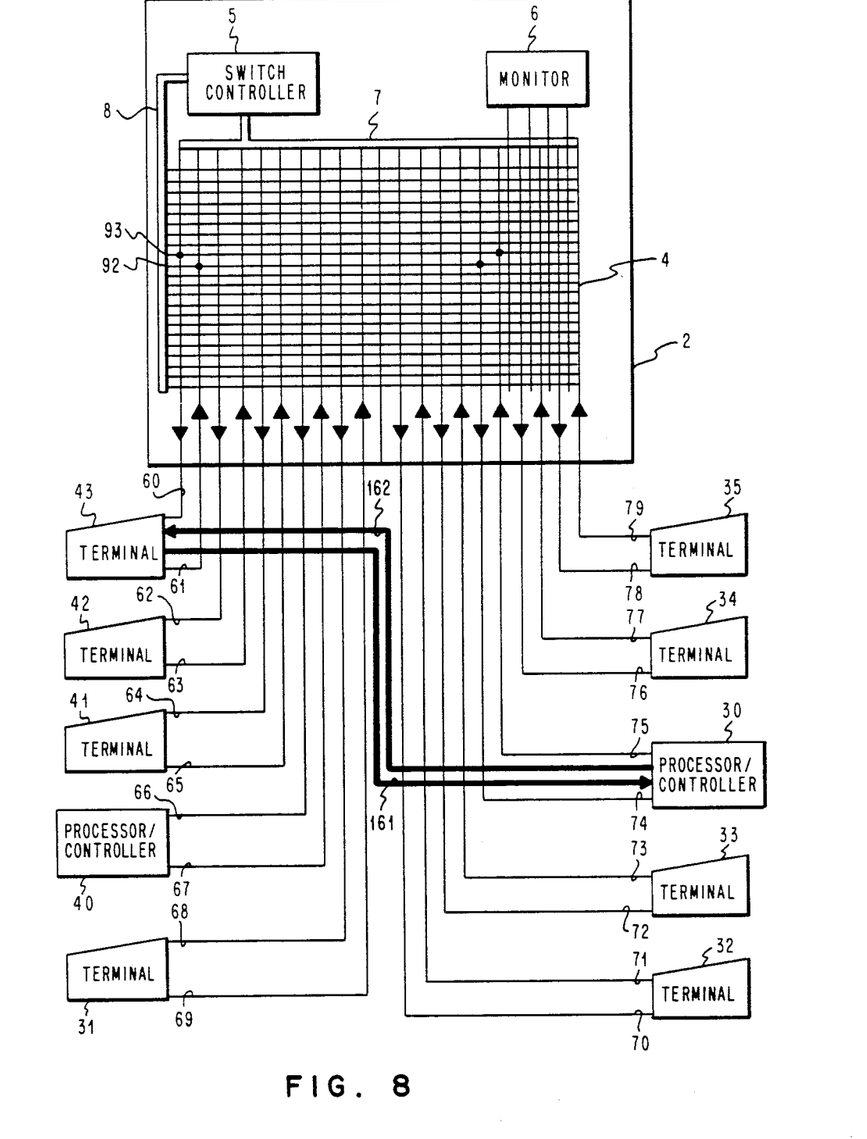
Figure 9:
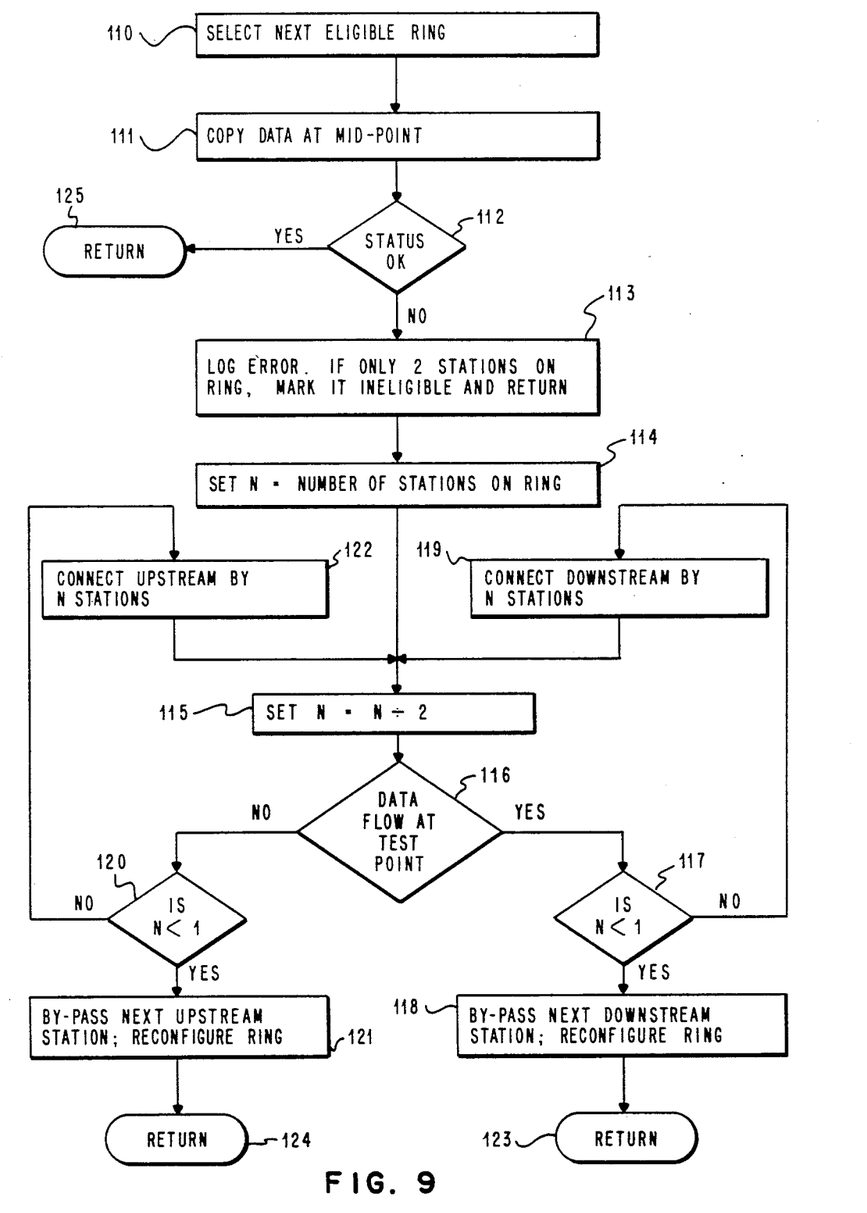
FIG. 9 is a flow diagram of the controller operation for monitoring the loop and bypassing a failing or removed station.

The starloop controller 2 is capable of connecting any element in the grid system to any other element in the grid system. Referring to FIG. 8, there is shown a connection between the processor 30 and the terminal 43. The output bus 75 of processor 30 is connected to the input bus 60 of terminal 43 along grid line 93. The output bus of terminal 43 is connected to the input bus 74 of processor 30 along grid line 92. These connections are illustrated by heavy bus lines 161 and 162 as shown in FIG. 8. In addition to providing the capability of connecting any number of the elements in the grid system in either a star or loop configuration, the starloop controller 2 through the monitor 6 provides the capability of monitoring an established communications ring for error conditions. FIG. 9 shows a logical flow representation of the trouble-shooting function of monitor 6. The monitor 6 checks each established communications loop in the system in turn as directed by the switch controller 5. The loop is entered in block 110 where the monitor selects the next eligible ring (network) to be tested. The ring is tested by copying the data at the mid-point of the loop in block 111, the midpoint being arbitrarily preselected. If the status of the data checks in block 112 then the monitor returns control to the switch controller 5 in block 125. If the status of the checked data contains an error, then in block 113 the error is logged to the switch controller and the loop is tested to determine if it only has two stations as for example shown in FIG. 8. If the loop only contains two stations, then the loop is disabled and processing is returned to the switch controller 5. If the loop contains more than two stations, then in block 114 the number of stations in the loop is set at N. In block 115 the loop is divided into two parts. In block 116 the loop is tested to determine if data is moving past the test point. If not, then if there is more than one station in the loop in block 120 the test connection by the monitor 6 is moved upstream by N stations and the test is reconducted. If data is flowing at the test point in block 116 then in block 117 the connection is moved downstream by N stations. This process is repeated until the malfunctioning station is isolated in block 118 or block 121 and removed from the loop, thus is formed a binary search means for testing and isolating failed units. The loop is then reconfigured to exclude the malfunctioning station and processing returned to the switch controller 5.

While the invention has been particularly shown and described with reference to the preferred embodiment thereof, it will be understood by those skilled in the art that various changes in form and detail may be made therein without departing from the spirit and scope of the invention.

I claim:

1. A starloop communication system comprising in combination:
   a plurality of terminals,
   a central processing unit, and
   a starloop controller including a digital switch and a switch controller operable to selectively connect said terminals to said central processing unit or to each other, said digital switch and said switch controller including means for connecting a first one of said terminals to an output port of said central processing unit for receiving messages from said central processing unit, means for sequentially connecting a first portion of said plurality of terminals into a loop network for transferring messages from said central processing unit and between ones of said terminals, means for connecting a last one of said first portion of said terminals in said loop network to an input port of said central processing unit for transferring messages from said terminals to said central processing unit,
   said starloop controller also including means for monitoring said loop network for continuity of exchange of messages between said terminals and
   said digital switch and said switch controller being operable to modify said loop network to exclude ones of said terminals detected by said means for monitoring as failing to maintain said continuity of exchange,
   said digital switch and said switch controller being further operable to connect a second portion of said terminals into a star network.

2. The starloop communication system of claim 1 wherein said digital switch and said switch controller include means for connecting said first portion of said plurality of terminals and said central processing unit into multiple loop networks.

3. The starloop communication system of claim 1 wherein said digital switch and said switch controller are operable to connect a third portion of said terminals into a multidrop network.

4. The starloop communication system of claim 3 wherein said digital switch and said switch controller include means for receiving terminal requests for reconfiguration of one of said loop, star, or multidrop networks and means for automatically reconfiguring said one of said networks in accordance with said received requests.

5. The starloop communication system of claim 1, or claim 2, or claim 3, or claim 4, wherein said terminals are peers of said central processing unit.

6. A starloop communication system comprising in combination:
   a plurality of terminals,
   a central processing unit,
   a starloop controller including a digital switch, a switch controller, and a monitor, wherein said digital switch and said switch controller are operable to connect said central processing unit and a first portion of said plurality of terminals into a loop network configuration and, with said monitor, automatically isolate terminals from said loop network configuration detected as failing to maintain a continuity of exchange of messages therein,
   said starloop controller also being operable to connect said central processing unit and a second portion of said plurality of terminals into a star network configuration, and
   said starloop controller also being operable to connect said central processing unit and a third portion of said plurality of terminals into a multidrop network configuration.

* * * * *